June 12, 1951 DE WITT W. INGLIS 2,557,030
FISHING DEVICE
Filed Feb. 13, 1947

Inventor:
DeWitt Wm Inglis

Patented June 12, 1951

2,557,030

UNITED STATES PATENT OFFICE 2,557,030

FISHING DEVICE

De Witt William Inglis, Chicago, Ill.

Application February 13, 1947, Serial No. 728,215

5 Claims. (Cl. 43—15)

This invention provides an automatically setting fishing hook of simple, effective, and economical construction, and one which is adapted to bottom fishing, deep or surface fishing, or trolling.

The invention further provides an angling attachment to which different types of hook or bait may be attached, and which includes a simplified, spring-actuated setting means releasable by a very simple and sensitive triggering or tripping means.

Automatic or self-setting fish hooks of various type are known in the art, but the present improvements afford a device which is very simple in construction and operation, and which lends itself to practical and conventional production methods and equipment, the device itself being sensitive for its intended purpose, easy to manipulate or set, quick and sure to trip responsive to disturbance of the bait, and flexible in that it is adaptable to several modes of use.

The construction and various aspects of novelty and utility characterising the invention will appear more fully as the following description proceeds in view of the annexed drawing, in which.

Figure 1:
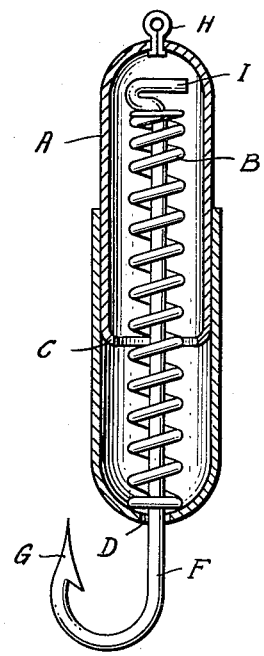
Fig. 1 is a vertical cross section through the device, showing the hook proper in normal or relaxed condition.

Referring to Fig. 1, the device includes a body portion in the nature of a tubular shell A having upper and lower rounded ends in the upper one of which is an eye insert H for attachment to the line or line leader.

Within the body or shell A is a compression spring B, the lower end of which is aligned with the hole D in the bottom of the shell, through which projects the lower shank portion F of the hook, which is provided with the usual barb G, and the upper extremity of which is offset to provide a setting or cocking projection I, and a stop or abutment formation against which the upper end of the spring seats, the main shank portion of the hook part passing upwardly through said spring.

Figure 2:
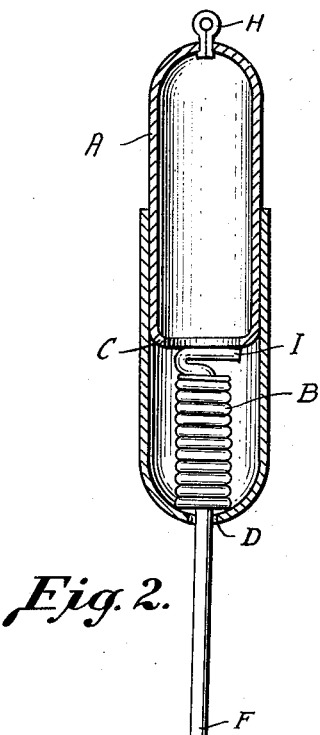
Fig. 2 is a sectional view similar to that of Fig. 1, but showing the hook in set condition.

The shell A is preferably constructed from interfitting halves which are shrunk, sweated, or forced together in finally assembled condition. The lower peripheral edge of the upper half of said shell assembly is turned in to provide a latching rim or formation C engageable by the cocking projection I when the hook is set with spring B compressed, as in Fig. 2, it being noted that the hook is free to rotate completely relative to said shell, and yet the setting or cocking can always be effectuated in any rotated position of the hook.

Thus, the latching or setting means includes the part I approximately concentric of the part C, it being noted, however, that the latching projection I preferably extends in a direction radially opposite from the hook barb G in relation to the long axis of the hook shank, by reason of which it will be apparent that disturbing efforts, as by nibbling at the bait, applied or acting in a variety of directions on the hook side of said shank, tend to displace said shank and withdraw the latching portion I from latching engagement with rim C.

Figure 4:
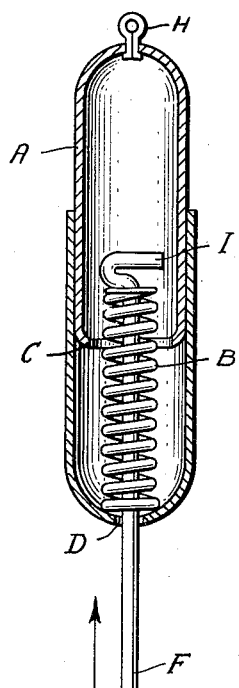
Fig. 4 is another sectional view similar to that of Figs. 1 and 2, and showing the initial upward displacement of the hook following tripping by disturbance of the bait.

Tripping or release of the set hook as aforesaid results in sudden upward displacement of the hook in the direction of the arrow in Fig. 4 and a consequent setting of the hook in the fish's mouth under circumstances where the point of the hook is appropriately situated at the moment of triggering to accomplish this, these circumstances being analogous to those existing where a hook is to be hand-set by jerking the line, excepting that the response of the device, being automatic, is likely to be more effective where the hook is properly baited by reason of the fact that this response follows upon the first seizure or disturbance of the bait triggering the device, and such triggering results in the main from disturbances occurring in the region of the barbed part of the hook.

Figure 5:
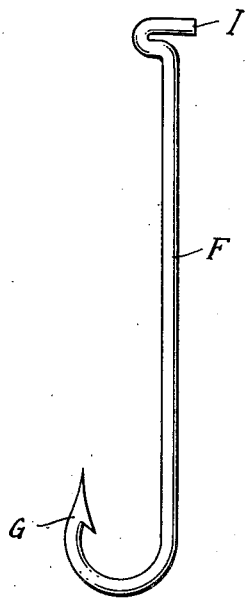
Fig. 5 is an elevational view of the hook structure.
Figure 6:
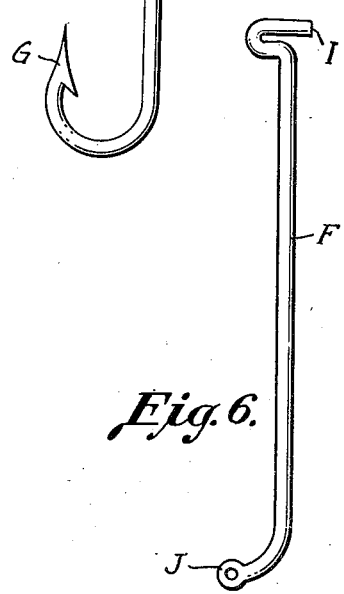
Fig. 6 is an elevational view of a modified hook structure for use with leaders and detachable baits.
Figure 3:
Fig. 3 is a top plan view of the device.

The construction of the hook element is shown in detail in Fig. 5, and in Fig. 6 there is shown a modification of said construction in which the barbed hook portions G are omitted and replaced by an eye portion J, to which various types of bait may be attached by leaders, or to which a hook leader may be attached for bottom fishing and the like. The shell A may be weighted or buoyant for desired depth control, or auxiliary weights or floats may be used with the device.

Having thus described my invention, what I claim and desire to protect by Letters Patent of the United States is:

1. An angling device of the class described and comprising a hollow shell, means at one end of said shell for attaching the same to a line, a hook having a long shank extending into said shell at an opposite end, a compression spring about said shank within said shell, a cocking loop at the end of said shank within said shell and including a lateral formation near said end against which said spring works to draw said shank into the shell, and an annular latching lip within said shell, said shank and spring, responsive to compression of the latter from normally expanded condition, passing centrally through said lip, said cocking loop having a nose engageable beneath said lip by slight rocking of said shank to latch the latter in set condition, slight rocking movements of said shank in certain directions effecting disengagement of the nose of the cocking loop from said lip and freeing said shank and hook for sudden upward motion for setting of the hook in a fish.

2. An automatically setting fishing bait device comprising a shell formed from two half-shells telescopingly interfitted, one of said half-shells having a rim portion disposed within the assembly of shells and turned inwardly to provide an annular latching lip, a shank member movable inwardly and outwardly of said shell substantially coaxially of the latter, said shank member being free to rock in a direction laterally of the axis of the shell, a spring about said shank within said shell, an offset at an end of the shank within said shell and providing an abutment for said spring whereby the latter urges said shank into the shell, said spring being compressible by movement of the shank outwardly of the shell to position said offset opposite said lip, said shank being rockable slightly to engage said offset beneath said lip to latch the shank in set condition, slight rocking motion of the shank in certain directions tending to disengage the offset from the lip to free the shank for withdrawal of the shank by said spring into the shell, the outer end of said shank having a bait attaching formation thereon, and a line connector on said shell.

3. An automatic hook-setting device for fishing and comprising a body and means thereon for attachment to a line, a bait member movable centrally into and outwardly of said body, spring means normally urging said bait member inwardly of said body, said bait member being movable outwardly of the body member to compress said spring means, a radial offset formed as an integral part of said bait member within said body member and constituting a catch element, an annular latching formation within said body member and beneath which said offset can be latched by sidewise movement of said bait member and offset, with said spring means in compression to set the device for triggering, said body having an opening for said bait member and the latter being guided by said opening in the bottom of said body to be movable in a direction generally lateral of said body member with respect to said opening as a fulcrum to disengage said offset from said latching formation to trigger the device for quick inward movement of the bait member by the spring.

4. A hook-setting device for fishing and comprising upper and lower hollow body members telescopingly fitted together to form a unit, a line attaching formation on the upper body member, the latter also having an axial endwall disposed at an approximately median region of the lower body member, a circular opening in said endwall and having peripheral margins constituting an annular latching lip, said lower body member having an axial endwall with a centrally disposed opening approximately concentric with said first-mentioned circular opening, an elongated bait member projecting into said unit through said opening in the lower body member, and a coil spring in said lower body member and surrounding a portion of the bait member therein, said bait member having an upper end portion offset within said lower body member to form a latching catch and also a stop for said spring, the latter being compressible between said catch and the lower body member by outward motion in setting said bait member, said catch being engageable beneath said latching lip in setting of the bait member as aforesaid, said bait member being released for movement by said spring from set condition by slight sidewise displacement to disengage said catch from said lip.

5. In an automatic, hook-setting fishing attachment, a tubular body member adapted to be attached at one of its ends to a line, and having opposite endwise rim portions turned inwardly to form an annular ledge, means attached to said body member and spaced axially away from, and in alignment with, said ends to define a guide, an elongated bait-attaching member passing through an opening in said guide and into said body member, with an inner end disposed interiorly of the latter, said opening fitting loosely with said bait member to permit rocking movement of the latter relative to said guide and laterally of the axis of said body member and the guide, said inner end of the bait member being offset laterally and turned back upon itself to provide oppositely projecting radial offsets adapted to pass through the opening of said annular ledge, at least one of said offsets constituting a catch movable in a lateral sense back and forth beneath said ledge to latch said bait member against, or free it for, longitudinal movement, and a coil spring acting between said guide and lateral offset formation on the bait member acting to draw the latter inwardly of said body, and compressible by outward setting of the bait member to be latched in set condition by lateral movement of the catch as aforesaid.

DE WITT WM. INGLIS.

REFERENCES CITED

The following references are of record in the file of this patent:

UNITED STATES PATENTS

| Number | Name | Date |
|---|---|---|
| 639,355 | Butz | Dec. 19, 1899 |
| 711,318 | Hymers | Oct. 14, 1902 |
| 1,295,448 | Dingwell | Feb. 25, 1919 |
| 1,383,474 | Lucas | July 5, 1921 |